(12) United States Patent
Sai et al.

(10) Patent No.: US 7,031,596 B2
(45) Date of Patent: Apr. 18, 2006

(54) DIGITAL VIDEO REPRODUCTION METHOD, DIGITAL VIDEO REPRODUCING APPARATUS AND DIGITAL VIDEO RECORDING AND REPRODUCING APPARATUS

(75) Inventors: Kairi Sai, Tokyo (JP); Reto Wettach, Tokyo (JP)

(73) Assignee: Sony Corporation, Tokyo (JP)

( * ) Notice: Subject to any disclaimer, the term of this patent is extended or adjusted under 35 U.S.C. 154(b) by 1163 days.

(21) Appl. No.: 09/826,588

(22) Filed: Apr. 5, 2001

(65) Prior Publication Data
US 2002/0012526 A1    Jan. 31, 2002

(30) Foreign Application Priority Data
Apr. 7, 2000    (JP) .............................. 2000-107238

(51) Int. Cl.
*H04N 5/91*    (2006.01)
(52) U.S. Cl. ......................................... 386/95; 386/126
(58) Field of Classification Search ................. 386/46, 386/83, 95, 111; 348/700
See application file for complete search history.

(56) References Cited

U.S. PATENT DOCUMENTS

| 5,642,174 A | * | 6/1997 | Kazui et al. | ................ 348/700 |
| 5,760,767 A | * | 6/1998 | Shore et al. | ................ 715/723 |
| 5,974,218 A | * | 10/1999 | Nagasaka et al. | ............. 386/46 |

FOREIGN PATENT DOCUMENTS

EP    0890910 A2 *    1/1999

* cited by examiner

*Primary Examiner*—Huy Nguyen
(74) *Attorney, Agent, or Firm*—Frommer Lawrence & Haug LLP; William S. Frommer; Thomas F. Presson

(57) ABSTRACT

A digital video reproduction method, a digital video reproducing (playing) apparatus and a digital video recording and reproducing (playing) apparatus that allows a spectator to easily and precisely shift (jump) the playing position to a scene of his choice an then start playing from a desired scene. According to such digital video reproduction method, digital video reproducing apparatus and digital video recording and reproducing apparatus, a time bar corresponding to the timeline for the video contents is displayed on the screen. Then, an icon showing the starting position of the event scene that is peculiar to the motion picture is displayed. Upon operating a remote controller, the spectator selects an icon of his choice by moving a cursor to the icon, so that the reproduction of image can be started from the starting position of the event scene corresponding to the selected icon.

18 Claims, 14 Drawing Sheets

DIGITAL VIDEO REPRODUCTION METHOD, DIGITAL VIDEO REPRODUCING APPARATUS AND DIGITAL VIDEO RECORDING AND REPRODUCING APPARATUS

BACKGROUND OF THE INVENTION

1. Field of the Invention

The present invention relates to a digital video reproduction method, a digital video reproducing (playing) apparatus and a digital video recording and reproducing (playing) apparatus. In particular the present invention is related to a digital video reproduction method, a digital video reproducing apparatus and a digital video recording and reproducing apparatus in which image reproduction can be started from a specific scene within the video contents.

2. Description of the Related Art

Conventionally, a video reproducing apparatus using magnetic tape as a recording medium is well known. With such video reproducing apparatus of magnetic tape method, information regarding contents recorded in a magnetic tape, for example information related to a scene that is peculiar to the event, is conventionally recorded by means of a spectator filling in a paper label and then attaching the paper label to the magnetic tape. During video reproduction, the spectator searched a desired image and by verifying the contents of the tape by looking at the paper label, fast-forwarding or rewinding the tape to a desired position and then reproduced the image.

On the other hand, nowadays with AV (audio-video) apparatuses becoming digital, random access storage such as a magnetic hard disk came to be adopted in video recording and reproducing apparatuses, thus originating an apparatus for saving video contents in a digital form. A capacity of a magnetic hard disk for saving video contents has become big, allowing recording of hours of video contents. In addition, information regarding the contents of recorded programs can be stored as electronic data and browsing of video contents, has become remarkably easy as compared to the case of a video recording and reproducing apparatus of magnetic type. In the U.S., companies such as TIVO and Replay TV sells such video recording and reproducing apparatus, so that search and reproduction of a spectator's desired image has been satisfied to some extent by employing such video recording and reproducing apparatuses.

In addition, with a DVD (Digital Versatile Disc) reproduction apparatus that have started to spread recently, which is an apparatus adopting random access storage, a set of contents is spliced beforehand into a number of episodes so that an episode can be reproduced promptly when the spectator wants to watch it.

However, in the conventional video reproducing apparatus of magnetic type, there is a problem of time spent in looking for a desired scene, as the spectator has to fast-forward and rewind the tape repeatedly during reproduction of the video when searching for the scene the spectator wants to see.

In a conventional video recording and reproducing apparatus having a random access storage, although it is possible to keep information on the contents related to a set of contents as a whole, information such as event information showing a particular scene included in the set of contents was not provided as an attribute of the contents. Therefore, in order to reproduce a desired scene in a video recording and reproducing apparatus of such type, for example, when reproducing video contents of a baseball match, if a spectator wishes to watch only a scene of a home run, it was necessity for the spectator to look for the desired scene by himself through fast-forwarding and rewinding in a similar way as the video reproducing apparatus of magnetic type. Such operation is inconvenient for the spectator and time consuming. Furthermore, by doing search by such operation of fast-forwarding or rewinding may cause overlooking of a relevant scene.

In spite of the fact that in a conventional DVD reproduction apparatus an episode in video contents is divided into each scene, as a scene is not determined by relevance of the event scene within the episode, in a similar way to a video reproducing apparatus of magnetic type and a video reproducing apparatus of a type having random access storage, it is not possible to easily jump onto a relevant event scene and reproduce it.

SUMMARY OF THE INVENTION

It is an object of the present invention to provide a digital video reproduction method, a digital video reproducing apparatus and digital video recording and reproducing apparatus in which it is possible to easily and precisely jump to a position of a scene that a spectator wants to watch, to then starting reproduction from such position.

According to a digital video reproduction method of the present invention, information on an event scene is stored as event information data and image is reproduced from an event scene using the event information data, so that data video contents can be easily reproduced from a desired event scene, when a spectator watches the video contents.

Similarly, according to a digital video reproducing apparatus of a first embodiment of the present invention, as image is reproduced from an event scene using stored event information data, video contents can be easily reproduced from a desired event scene, when a spectator watches video contents.

According to a digital video reproducing apparatus of a second embodiment of the present invention, video contents and event information data are received by a communications means and a means for controlling image reproduction, for at least reproducing image based on video contents and metadata, is provided. As the means for controlling image reproduction reproduces image from an event scene selected by a spectator by using the event information data, the video contents can be easily reproduced from a desired event scene, when a spectator watches the video contents by using the event information, without having to provide storage for the digital video reproduction apparatus.

According to a digital video recording and reproducing apparatus of a third embodiment of the present invention, there is provided a contents input means for inputting video contents, an event information data input means for inputting event information data and a storage means for storing the video contents and the event information data. The event information data is inputted as added to the video contents or separated from the video contents so that the video contents can be easily reproduced from a desired event scene when a spectator watches video contents, using not only specific event information data related to a single video content, but a variety of event information.

According to a digital video reproducing apparatus of a fourth embodiment of the present invention, a search means is provided for searching an event information data having an attribute selected from all event information data stored in a storage, through an operation by a spectator. As a result, it is possible to search and watch a desired event scene from all contents within the video storage, without being limited to a single video content. Accordingly, it is possible to provide a new and efficient video watching stile to the spectator.

According to another digital video reproduction method, another digital video reproducing apparatus and another digital video recording and reproducing apparatus of the present invention, a timeline corresponding to a reproduction time of video contents is displayed as a time bar on the display screen, an icon corresponding to each event scene is displayed in the starting position of an event scene on time bar, and an image is reproduced from the starting position of the event scene corresponding to the icon selected by the spectator. As a result, it is possible to easily make the starting position jump from a current playing position to a desired event scene, so that the spectator can start the reproduction of video image from the desired event scene.

In addition, according to another digital video reproduction method, another digital video reproducing apparatus and another digital video recording and reproducing apparatus of the present invention, when display becomes such that it is difficult for the spectator to distinguish icons, a fixed area including a selected point on the time bar is displayed as an expanded time bar, so that the expanded time bar displays only icons corresponding to the event scene included in such fixed area. As a result, when the time bar is expanded, for example, by means of an operation of a remote controller, it is possible to browse icons that cannot be displayed at once.

Still, according to another digital video reproduction method, another digital video reproducing apparatus and another digital video recording and reproducing apparatus of the present invention, when display becomes such that it is difficult for the spectator to distinguish icons, a reproduction time partition is defined on a timeline corresponding to the whole reproduction time, a scrolling time bar corresponding to the selected reproduction time partition is displayed and an icon corresponding to an event scene included in the selected reproduction time partition is displayed on the scrolling time bar. As a result, when the time bar is scrolled, for example, by means of an operation of a remote controller, it is possible to browse icons that cannot be displayed at once.

Moreover, another digital video reproduction method, another digital video reproducing apparatus and another digital video recording and reproducing apparatus of the present invention, when display becomes such that it is difficult for the spectator to distinguish icons, a time bar is displayed split in plural and non linear partitions, so that a displayed time density is minimum for the partition selected by the spectator and becomes higher for a partition located far from such selected partition, and an icon corresponding to the event scene included in each partition is displayed only to the extent that the displayed icons do not overlap within each partition during display on screen. As a result, it is possible to display an icon for only a portion that the spectator is interest in, so that the spectator can browse information on event scenes throughout all video contents efficiently and, furthermore, the spectator can easily jump to a starting position of a scene of his choice.

BRIEF DESCRIPTION OF THE DRAWINGS

The foregoing and other objects, features and advantages of the present invention will be apparent to those skilled in the art from the following description of the preferred exemplary embodiments of the present invention taken in conjunction with the accompanying drawings, in which.

DESCRIPTION OF THE PREFERRED EMBODIMENTS

Figure 1:
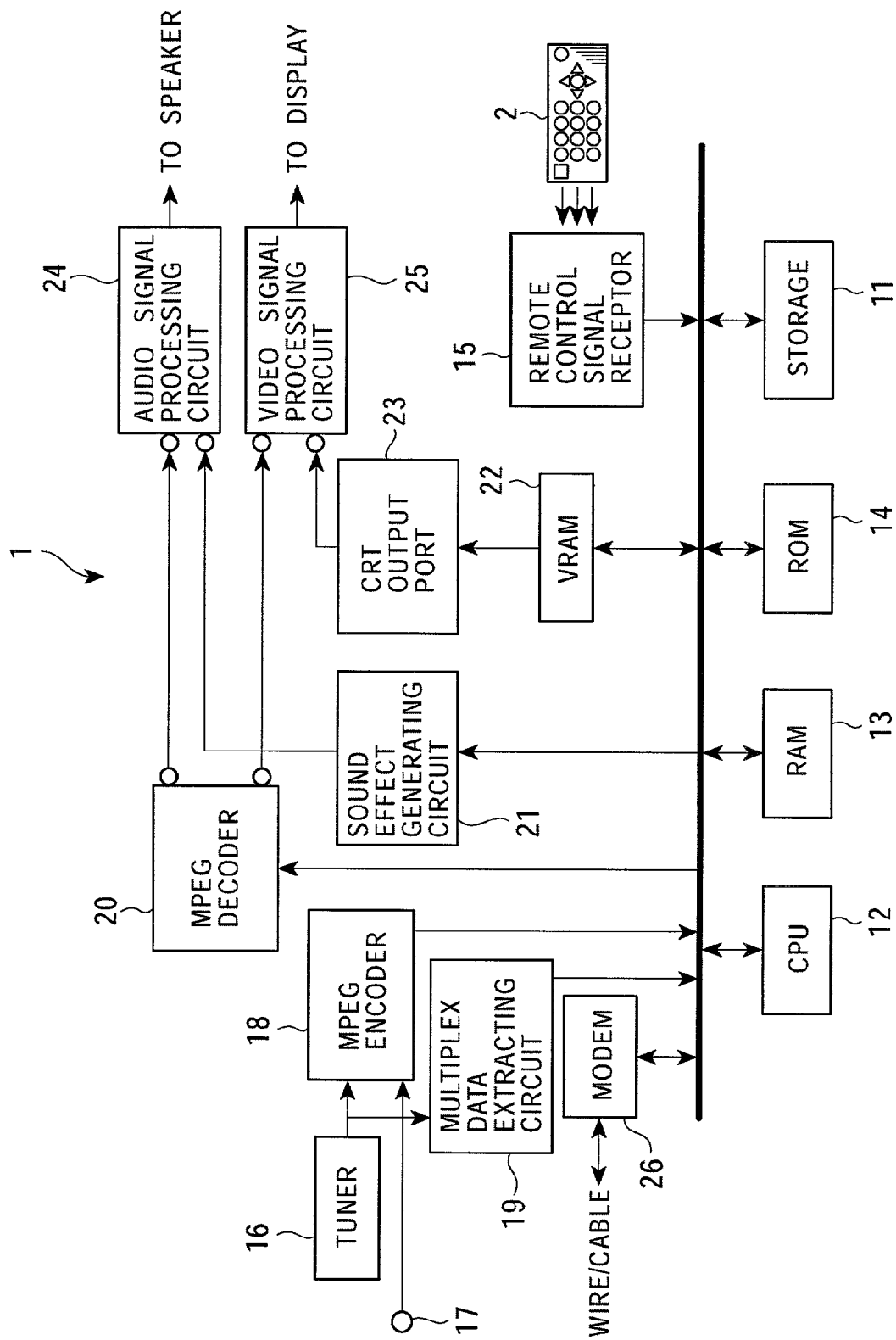
FIG. 1 is a block diagram of a digital video recording and reproducing apparatus according to a first preferred embodiment of the present invention.

A digital video recording and reproducing apparatus according to a first preferred embodiment of the present invention is described based on FIG. 1 to FIG. 9. At first, a constitution of a digital video recording and reproducing apparatus is described based on a block diagram of FIG. 1.

In a digital video recording and reproducing apparatus 1, a storage 11 comprising a magnetic hard disc is provided. Although video contents and event information data to be described below are stored in storage 11, in addition an OS (operating system) and an application program are also stored. In addition, in the digital video recording and reproducing apparatus 1, a CPU 12 performing various kinds of processing, a RAM 13 used as temporary data storage area during performance of the CPU 12, a ROM 14 for permanent storage for a basic software module and an activation module for activating the CPU 12 are provided. When power of digital video recording and reproducing apparatus 1 is turned from an OFF to an ON status, the activation module stored in the ROM 14 and the storage 11, the OS and the application program are loaded into RAM 13 and are executed according to request. Further, a remote control signal receptor 15 connected to the CPU 12 is provided for the digital video recording and reproducing apparatus 1. When a remote control signal 2 of a separate embodiment from the digital video recording and reproducing apparatus 1 is operated by pointing toward remote control signal receptor 15, an operation command is originated from the remote control signal 2, so that the operation command is collected by the remote control signal receptor 15. The operation command is then outputted against the CPU 12 from the remote control signal receptor 15 and processed at the CPU 12.

In addition, in the digital video recording and reproducing apparatus 1, a tuner 16, an external input portion 17, an MPEG encoder 18 and a multiplex data extraction circuit 19 are established. The tuner 16 and the external input portion 17 are connected to the MPEG encoder 18 so that, when recording video contents, the video signal inputted from the tuner 16 or the external input portion 17 is encoded at the MPEG encoder 18. Further, the tuner 16 and the external input portion 17 are connected to the multiplex data extraction circuit 19, so that, along with the video signal, the tuner 16 or an event information data inputted from the external input portion 17 are extracted from inside the multiplexed video signal by means of a VBI (Vertical Blanking Interval) method at the multiplex data extraction circuit 19. The MPEG encoder 18 and the multiplex data extraction circuit 19 are connected to the storage 11, so that the event information data and the encoded video signal are stored in storage 11.

In addition, in the digital video recording and reproducing apparatus 1, a MPEG decoder 20, an sound effect generation circuit 21, a VRAM 22, a CRT output port 23, an audio signal processing circuit 24 and an video signal processing circuit 25 are provided. The audio signal process circuit 24 and the video signal processing circuitry 25 are connected to the MPEG decoder 20 and the MPEG decoder 20 is connected to the RAM 13. Still, the RAM 13 is connected to the storage 11. When reproducing the digital video contents saved in the storage 11, the video data to which the video contents are stored in is loaded into the RAM 13 and sent out to the MPEG decoder 20. In the MPEG decoder 20, the video data is decoded in video soundtrack signal and video image signal, the video soundtrack signal and the video image signal are each outputted to the audio signal processing circuitry 24 and the video signal processing circuit 25. The audio signal processing circuit 24 and the video signal processing circuit 25 are respectively connected to a loud speaker and a display (not shown in the figure), so that the audio signal circuit 24 sends out a video soundtrack signal to the loud speaker and the video signal processing circuit 25 sends out video image signal to the display.

The sound effect generation circuitry 21 is connected to the CPU 12 and the audio signal processing circuitry 24. In addition, the CPU 12 is connected to the VRAM 22, the VRAM 22 is connected to the CRT output port 23. Furthermore, the CRT output port 23 is connected to the video signal processing circuit 25. During reproduction of the digital video contents, when the CPU 12 recognizes an operation command from the remote control signal 2, the CPU 12 instructs the sound generation circuit 21 to generate an sound effect such as a sound effect tone to show that an operation of the remote control signal 2 is done. The sound effect generation circuitry 21 generates an sound effect signal and sends it out to the audio signal processing circuit 24. The audio signal processing circuit 24 synthesizes the video sound signal and the sound effect signal and sends them out to the speaker. Moreover, a user interface image is generated in the VRAM 22 upon processing by CPU 12. The CRT output port 23 converts the image data on the VRAM 22 to a secondary image signal, and then sends the data out to the video signal processing circuit 25. The secondary image signal generated by the CRT output port 23 is combined with the video image signal from the MPEG decoder 20 in the video signal processing circuit 25 and sent out to the display which is not shown in the figures.

In addition, a modem 26, connected to a communication line not illustrated, is provided in the digital video recording and reproducing apparatus 1, for communication with the outside and for controlling communication. The digital video recording and reproducing apparatus 1 can receive event information data and video contents through the modem 26.

Figure 2:
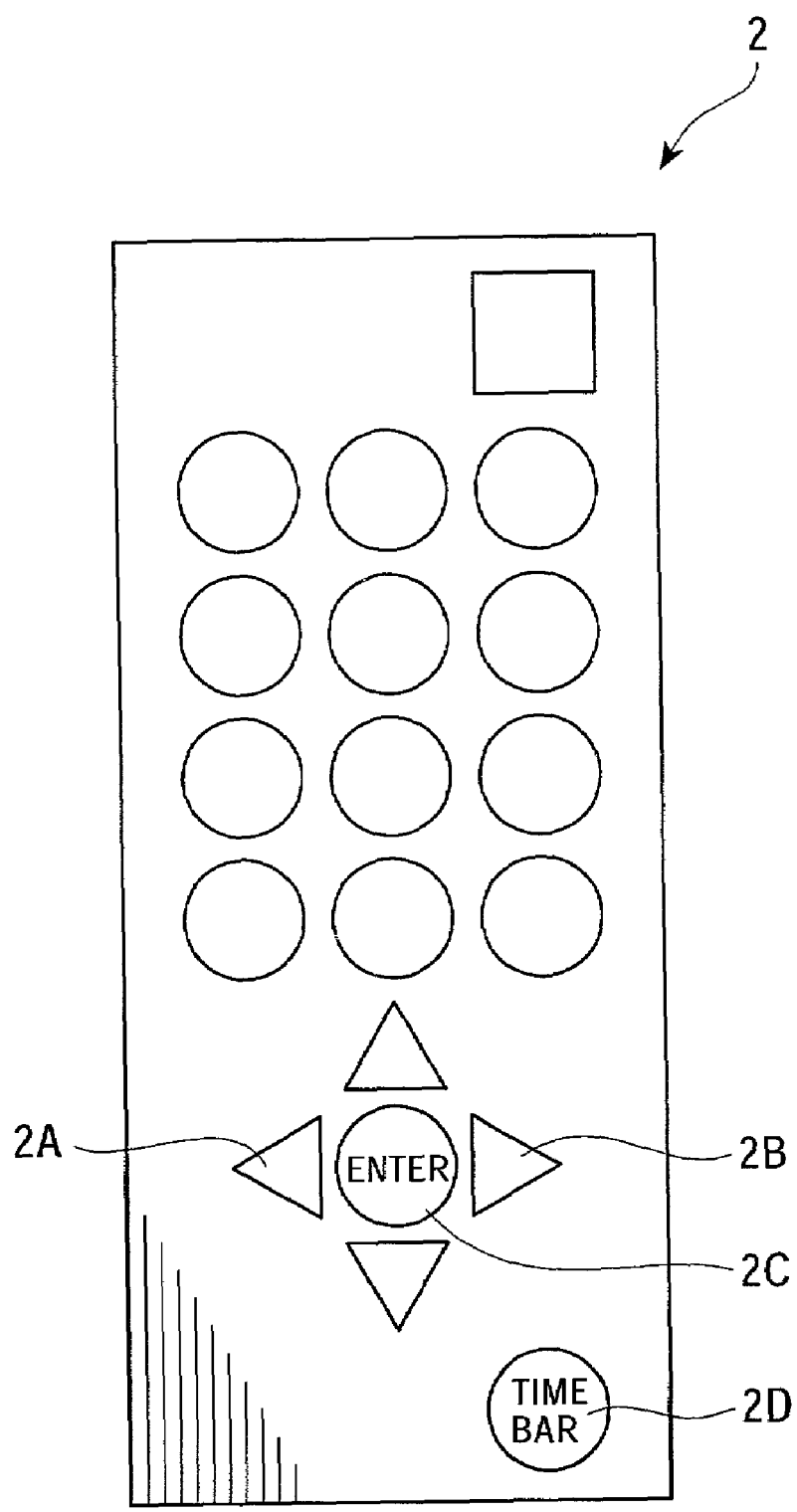
FIG. 2 is a diagram showing a remote controller according to the digital video recording and reproducing apparatus of the first preferred embodiment of the present invention.

A plurality of buttons such as a left direction button 2A, a right direction button 2B, an enter button 2C and a time bar button 2D are established on the remote controller 2 as shown in FIG. 2. When the spectator pushes the left direction button 2A and the right direction button 2B, an operation such as selection of an icon, which is described below, is executed. When the spectator pushes the enter button 2C after selection is done by means of the left direction button 2A, a command indicating the selection is sent to the CPU 12. When the spectator pushes the time bar button 2D, it becomes possible to display a time bar, described below, on the screen. In addition, the time bar is turned off when the spectator pushes the time bar button 2D while the time bar is displayed. Still, the remote controller 2 has buttons for executing functions of a conventional video recording and reproducing apparatus, such as a reproduction button, a stop button, a picture recording button, etc.

Figure 3:
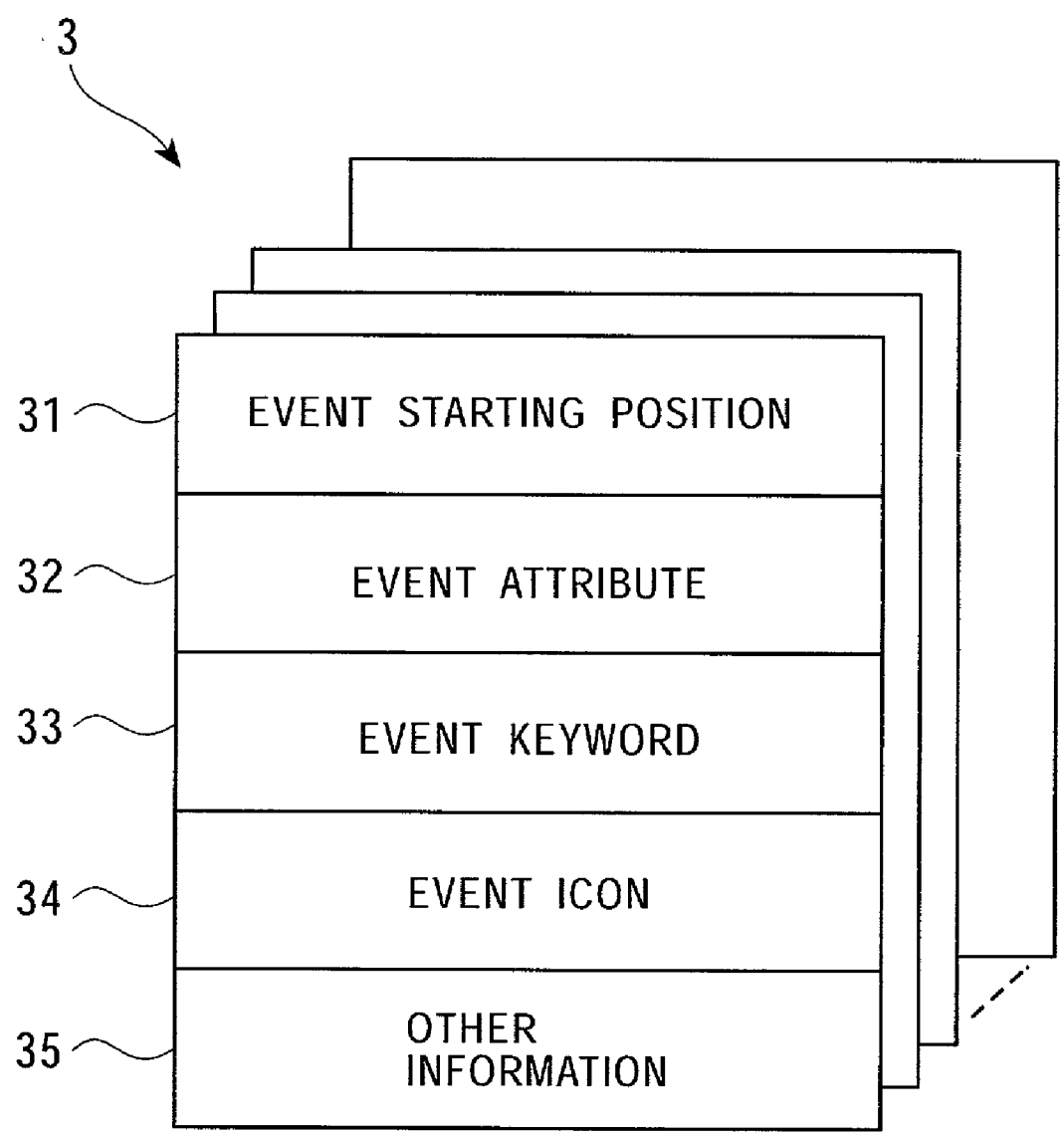
FIG. 3 is a data structure view showing an event information data used in the digital video recording and reproducing apparatus of the first preferred embodiment of the present invention.

An event information data 3 is metadata related to one set of video contents. As shown in FIG. 3, the event information data 3 includes information of an event starting position 31, an event attribute 32, an event keyword 33, an event icon 34 and other information 35. In the event starting position 31, a starting position of an event scene which is considered characteristic or important within a video image of a motion picture is included as information of a relative time from the top of the video contents. In the event attribute 32, information regarding feature or category of an event is included. An example of feature or category of an event is information indicating the nature of an event, like a home run in baseball or a goal in soccer. The event key word 33 includes a keyword related to the event scene, for example information like name of the athlete in a sports event, name an actor, name of the place where an event scene place or the like. Still, the event keyword 33 can store a plurality of information. In addition, it is possible to retrieve an event information data described below, upon search by the event attribute 32 and the event key word 33. The event icon 34 includes image data of an icon to be shown on a time bar described below, indicating the location of an event scene. Such image data is set up beforehand. The other information 35 is constituted to include relevant information other than information included in the group above, from the event starting position 31 to the event icon. As there is usually a plurality of the event information data 3 regarding one set of video contents, event information data is arranged as in the arrangement of the event information data 3. In addition, an event number peculiar to each order of arrangement is assigned to each event information data 3, so that a desired event information data 3 can be read out by means of specifying the event number. Such event number is stored in the event information data 3.

The event information data 3 is made by a broadcasting station and transmitted multiplexed with a television broadcasting signal, the transmitted television broadcasting signal being received by the tuner 16 in the digital video recording and reproducing apparatus 1. In addition, the television broadcasting signal can be introduced to the digital video recording and reproducing apparatus 1 by way of a communication path such as, for example, from the broadcasting station to the Internet, through the modem 26. The event information data 3 can be also made in the broadcasting station and in a service facility of a third party other than the spectator, and introduced to the digital video recording and reproducing apparatus 1 through the communication path of the Internet. Moreover, the event information data 3 can be added as corresponding to a desired event scene while the spectator watches a video image based on the video contents and, still, the event information data 3 can be made by means of an automatic event searching computer software stored in the storage 11. Further, although it is possible for the digital video recording and reproducing apparatus 1 to store the event information data 3 together with the video contents data in the storage 11, it is also possible to separate the event information data 3 regarding all video contents, from the video contents data within the storage 11, thus storing as unified in another separate area in the storage 11.

Figure 4:
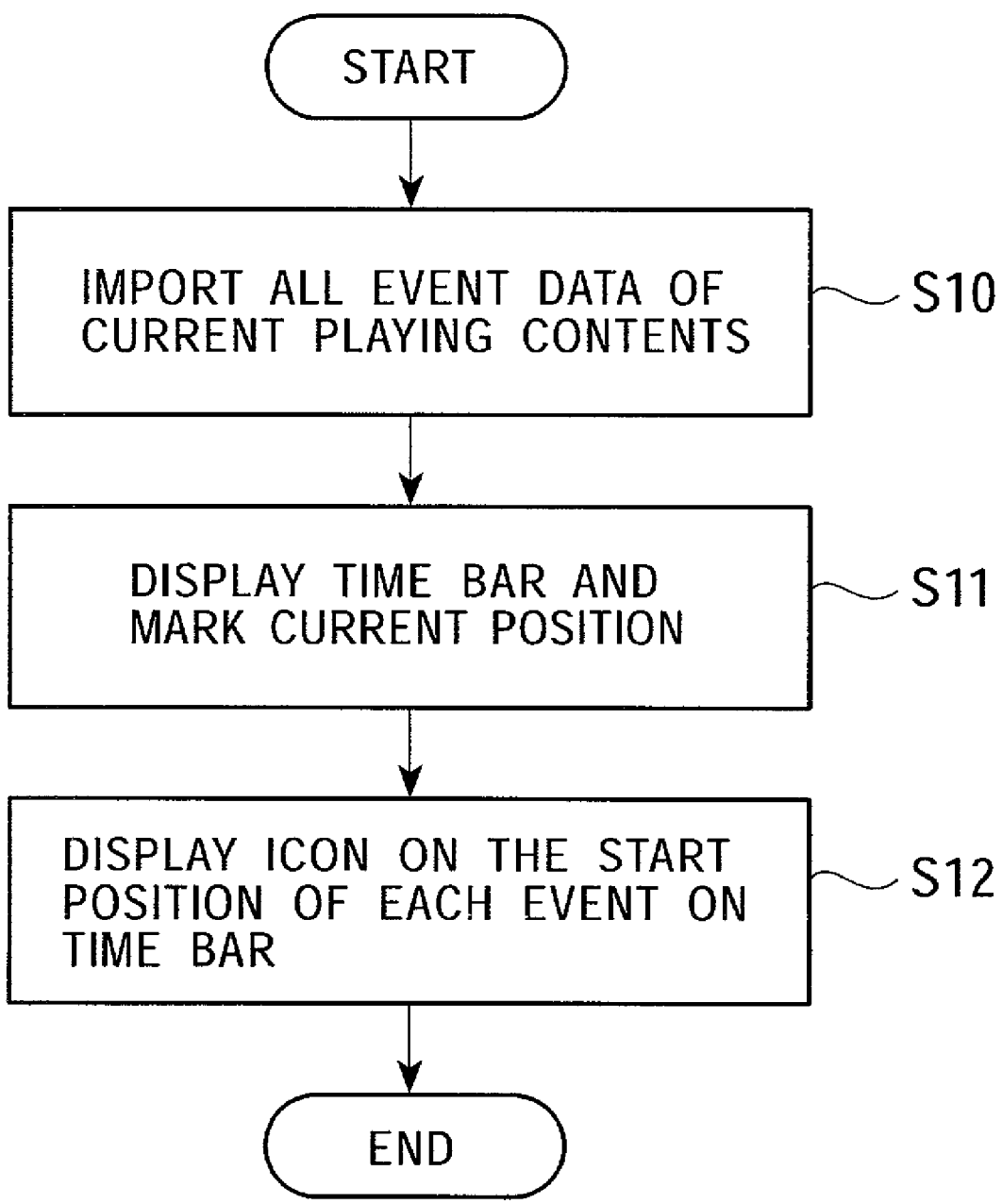
FIG. 4 is a flow chart showing a process for a time bar display according to the digital video recording and reproducing apparatus of the first preferred embodiment of the present invention.

Next, a description of a display of the time bar using the event information data is provided below. When a spectator pushes the time bar button 2D on the remote controller 2 during reproduction of a video image, a time bar display is performed. As shown in FIG. 4, at first all event information data 3 regarding the current playing video contents is imported to the RAM 13 (S10). Then, a time bar is displayed on the screen, and a current playing position is marked in order to allow recognition by the spectator (S11). Next, a position of each event scene on the time bar is calculated by using information on the starting position of the event scene stored in the event starting position 31 of each of the event information data 3 to then display in the calculated position, an icon corresponding to each event scene (S12).

Figure 5:
FIG. 5 is an illustration showing display of a time bar and an icon according to the digital video recording and reproducing apparatus of the first preferred embodiment of the present invention.

When a time bar display processing is performed, a time bar 100 and a plurality of an icon is displayed in a lower portion of a video image screen, as shown in the example of a time bar for a soccer game in FIG. 5. The time bar 100, showing the course of the whole game, corresponds to an entire reproduction time. In a position slightly left from the center of the time bar 100, there is a color changing point 101 of the time bar 100, showing a current video image playing position. In addition, a blank portion 102 is displayed in approximately a central position of the time bar 100. Such blank portion 102 shows a halftime intermission between first half and second half of the game. A current object of remote controller operation by the operator or an object of icon selection is shown by a cursor 103. A shooting scene is shown by an icon 104 as well as an icon 105 showing a goal scene, an icon 106 showing a yellow card scene and an icon 107 showing a red card scene.

Figure 6:
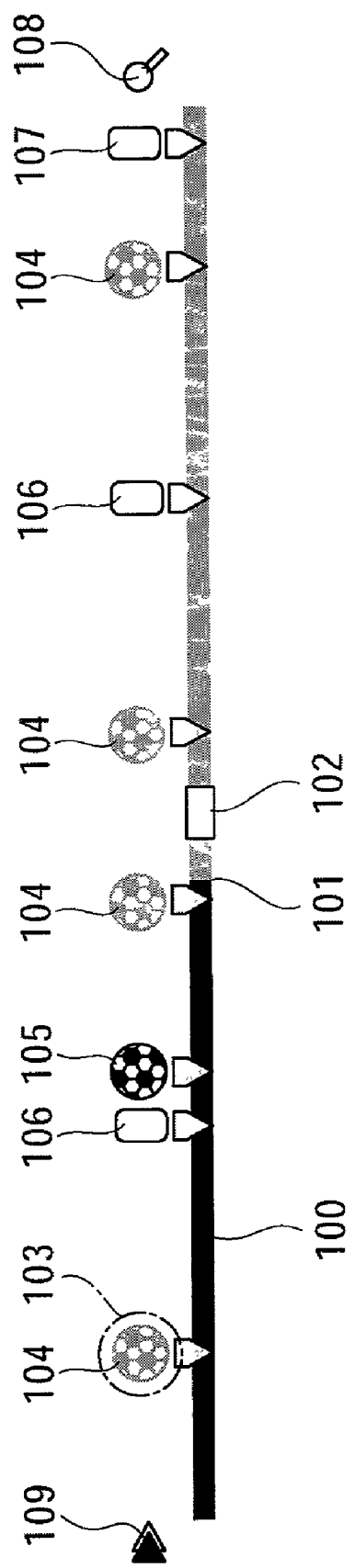
FIG. 6 is a diagram showing an icon selected among the icons displayed on the screen according to the digital video recording and reproducing apparatus of the first preferred embodiment of the present invention.

When the spectator pushes the right direction button 2B of the remote controller 2 at the scene shown in FIG. 5, the cursor 103 moves towards a right direction and is displayed on the time bar 100 in a location of the icon 104 at extreme left side, as shown in FIG. 6. Furthermore, when the right button 2B is pushed, the cursor 103 moves to an icon that is nearest to the current position towards the right side, that is, in the example of FIG. 5, to the place of the icon 106 showing a yellow card scene. In a similar way, when the spectator pushes the left direction button 2A, the cursor 103 moves to a place of an icon that is nearest to the current position towards the left side.

When all icons cannot be displayed on the time bar 100 to an extent that the spectator can recognize each icon because there is a great amount of icons to be displayed on the time bar 100, a process is done in which one partition of the time bar 100 is magnified and re-displayed over the whole time bar. As shown in FIG. 8(a), such process is started when the spectator pushes the right direction button 2B, then selects an icon 108 displayed in the vicinities of the far right side end portion of the time bar 100 and pushes enter button 2C. An aspect that differs from the process of the above mentioned time bar display is that a time bar 200 displays only icons included within one partition of time bar 100. Therefore, in such process, as for step S10 of FIG. 4, instead of importing all the event information data 3 for the current playing video contents, only the event information data 3 corresponding to an event scene included within one partition of a predetermined partition on time bar 100 is imported. Apart from that, other procedures are the same as the procedures for a time bar display described before. Moreover, magnification rate of the magnified partition is determined automatically.

From the process of expanding and re-displaying, the time bar 200 and plural icons are displayed, as shown in FIG. 8(b). Broken lines shown between FIG. 8(a) and FIG. 8(b) show a partition of the time bar 100 of FIG. 8(a) that the time bar 200 of FIG. 8(b) magnifies. According to the example shown in FIG. 8(b), the magnification rate is determined automatically at 3 times in relation to FIG. 8(a), so that the partition on the time bar 200 is taken automatically under a proportion of 3 to 1 towards both forward and backward directions from the current playing position. On the time bar 200 of FIG. 8(b), icons 211, 212, 213 that were not displayed in the time bar 100 in FIG. 8(a) are displayed. In addition, a thickness of the time bar 200 is displayed approximately 3 times thicker in correspondence to the magnification rate, so that when the spectator recognizes the thickness of the time bar 200 by visual cognition, the spectator can notice the performed magnification rate. By the way, icon 211 expresses a dangerous scene, icon 212 expresses a dribble scene and, in addition, icon 213 shows a scene of a doubtful judgment.

Figure 7:
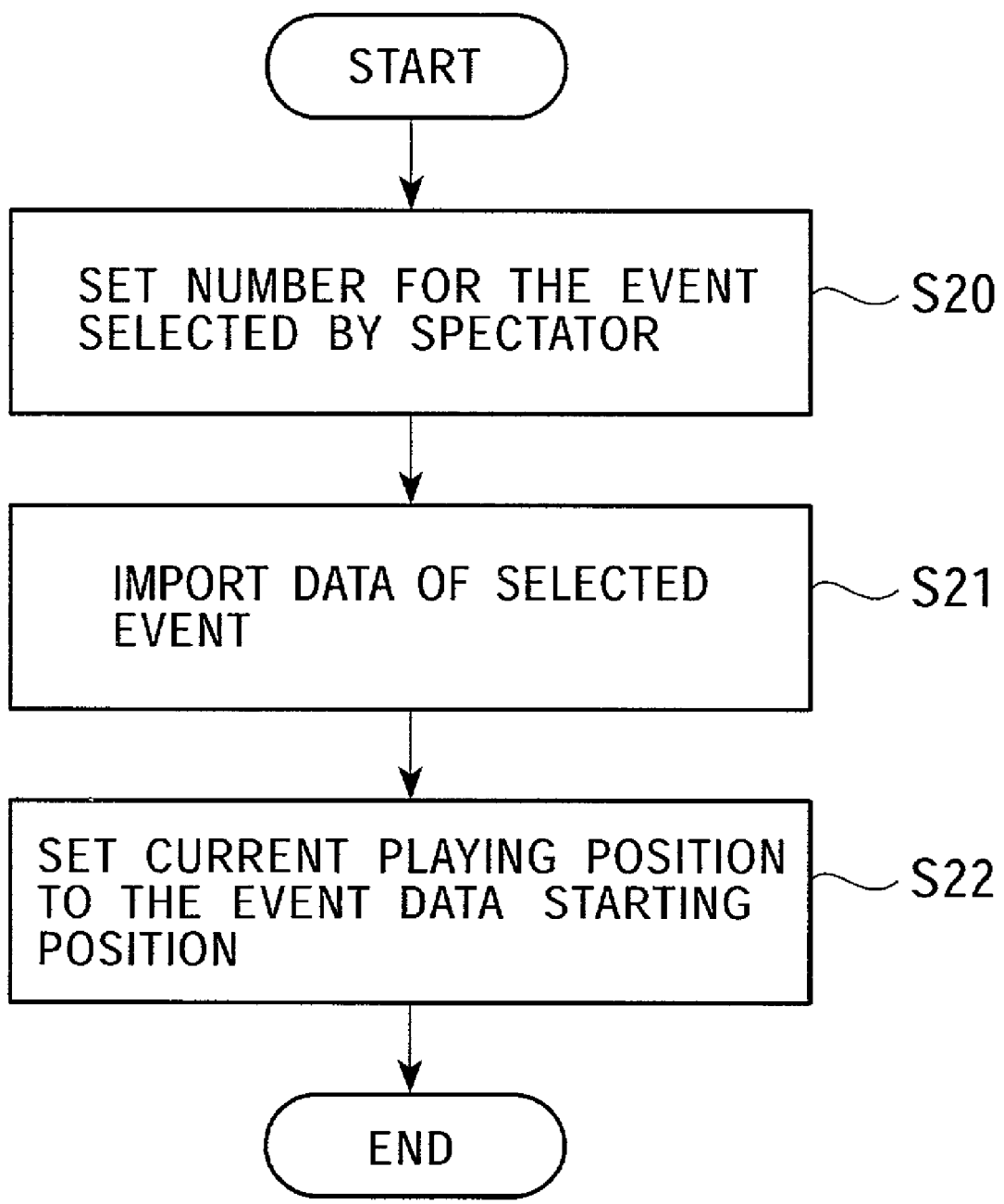
FIG. 7 is flowchart showing a process of starting a reproduction from an event scene according to the digital video recording and reproducing apparatus of the first preferred embodiment of the present invention.
Figure 8:
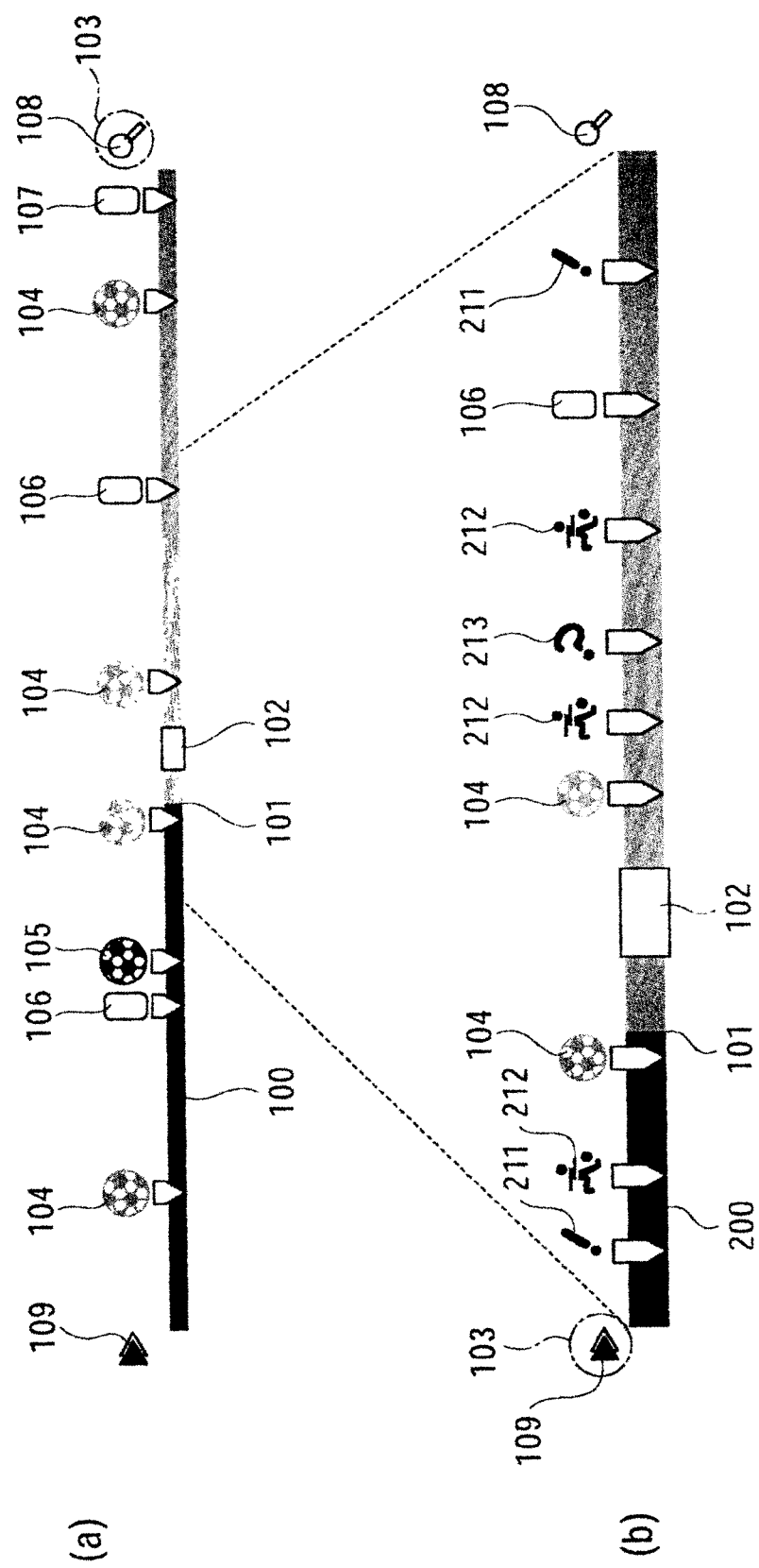
FIG. 8 is a diagram showing a change that occurs when expanding and displaying one partition of the displayed time bar, according to the digital video recording and reproducing apparatus of the first preferred embodiment of the present invention.

When the enter button 2C of the remote controller 2 is pushed by the spectator when the cursor 103 is on either of icons 104, 105, 106 or 107, the current video reproduction is interrupted, and a process of jumping onto an event scene corresponding to the icon on which the cursor 103 is located is started. For example, upon pushing the enter button 2C when the icon 104 is selected by the cursor 103 as shown in FIG. 6, reproduction (reproduction) is started from a scene of a dangerous shooting corresponding to the icon 104. According to such process, as shown in FIG. 7, at first, an event number is set for the event information data 3 corresponding to the icon 104 that a spectator has selected (S20). Then, the event information data 3 corresponding to the acquired event number is imported (S21). Next, using the imported information stored as the event starting position 31 of the event information data 3, a position for starting reproducing the video contents is set and then reproduction is started. Finally, display of the time bar is turned off (S22).

When the spectator pushes the enter button 2C with the cursor 103 located in a position of a triangle-shaped icon 109 for easy jumping command, located in the vicinity of a left end portion of the time bar 100, the current video reproduction is stopped, and a process similar to the above-mentioned jumping and reproduction process is performed. An aspect which is different from the above-mentioned process is that reproduction is started from an event scene on the time bar 100 corresponding to a nearest icon displayed righter than the current playing position. Therefore, instead of setting the event number for the event information data 3 corresponding to the icon 104 selected by the spectator in the step S20 of FIG., the event number is set for the event information data 3 on the time bar 100 corresponding to the nearest icon 104 that is displayed in a location that is righter than the current playing position. Apart from that, other procedures are the same as the above-mentioned process of jumping and playing.

As only a predetermined icon corresponding to an event scene included within a partition selected by the spectator is displayed on the time bar, browsing can be done for icons that cannot be thoroughly displayed, upon having the spectator magnifying and re-displaying the time bar upon operation of the remote controller 2.

Figure 9:
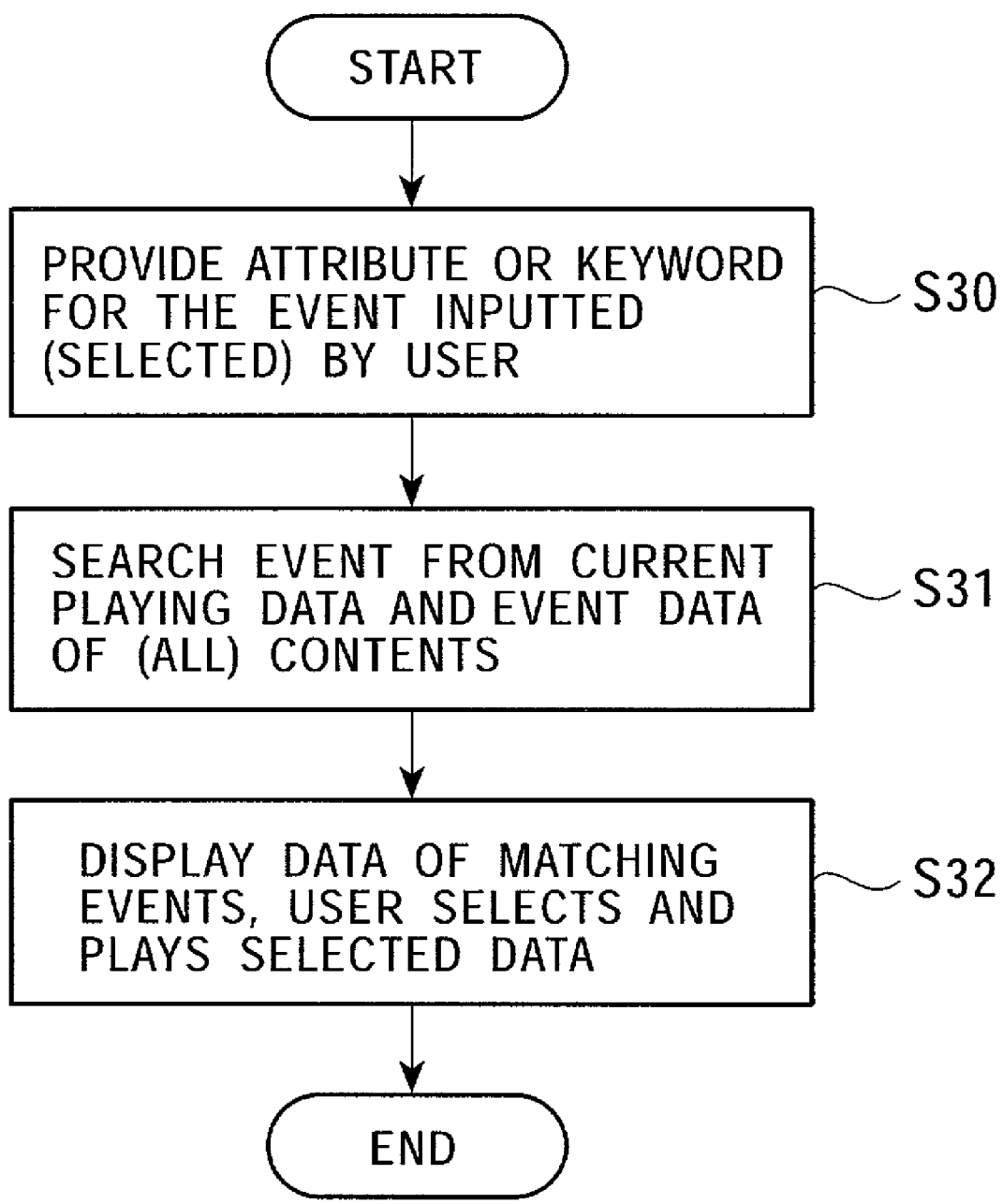
FIG. 9 is a flowchart showing a process of searching information of a desired event scene according to the digital video recording and reproducing apparatus of the first preferred embodiment of the present invention.

According to the digital video recording and reproducing apparatus 1 of the first preferred embodiment of the invention, by means of an application program loaded in the storage 11, searching of a desired event within all contents can be done can be done by event attribute 32 or event keyword 33, using the event information data 3 corresponding to all contents in the storage 11. In such search process, as shown in FIG. 9, first, the event attribute 32 or the event keyword 33 is provided (S30). The provision of the event attribute 32 or the event keyword 33 is done by the spectator on a predetermined search screen upon an input operation of the remote controller 2. Then, all event information data 3 corresponding to all video contents including current reproducing video contents is read out (S31) to then picking up either the event attribute 32 provided through the procedure under step S30 or event attribute 32 matching the event keyword 33 or the event information data 3 having the event keyword 33 and listing up the information on the event scene corresponding to such event information data 3 on the screen. Furthermore, the spectator selects an event scene from such list and starts reproduction from the selected event scene (S32).

Figure 10:
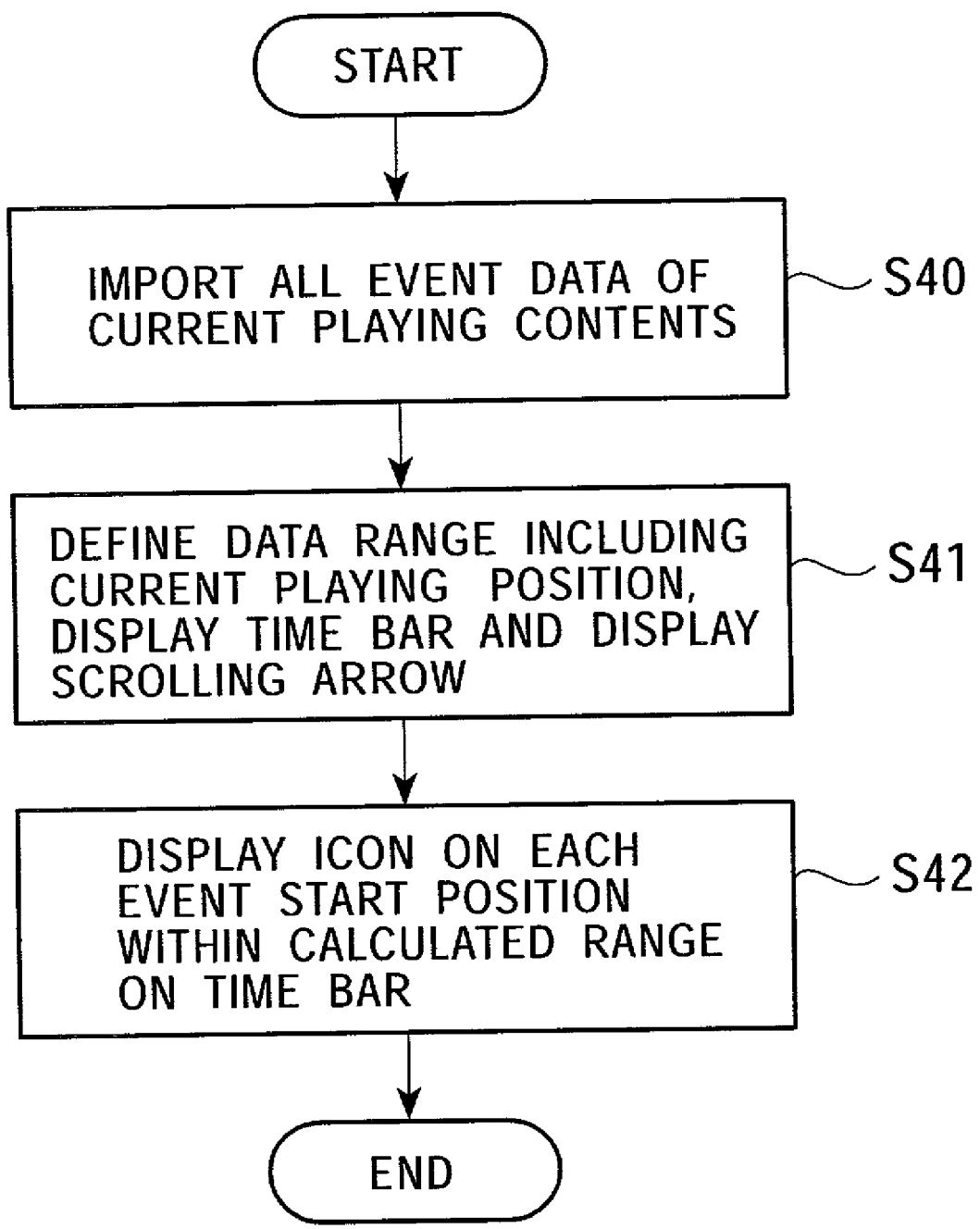
FIG. 10 is a is a flowchart showing a process of displaying a scrolling time bar according a digital video recording and reproducing apparatus of a second preferred embodiment of the present invention.
Figure 11:
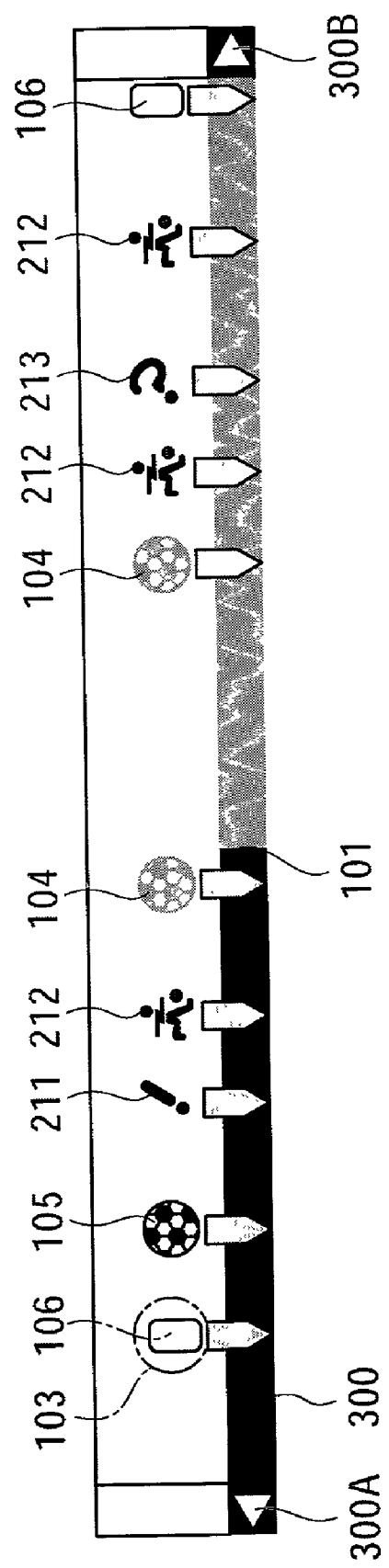
FIG. 11 is a diagram showing the scrolling time bar displayed on the screen, according to the digital video recording and reproducing apparatus of the second preferred embodiment of the present invention.

Next, a digital video recording and reproducing apparatus according to a second preferred embodiment of the invention is described based on FIG. 10 to FIG. 11. Such second embodiment differs from the digital video recording and reproducing apparatus of the first preferred embodiment of the invention only in aspect displaying scroll time bar 300 is different from only one partition of appointed interval is magnified, and displaying.

When all icons cannot be displayed on the time bar 100 to an extent that the spectator can recognize each icon because there is a great amount of icons to be displayed on the time bar 100, a time bar 100 corresponding to the whole reproduction time of the video contents is not displayed and instead, a scrolling time bar 300 (see FIG. 11) is displayed. The process of displaying such scrolling time bar 300 starts when the spectator pushes the time bar 2D on the remote controller 2 so as to command displaying of the time bar. As shown in FIG. 10, at first, all event information data corresponding to current playing video contents are imported (S40). Then, one partition including a current position is determined in accordance to a predetermined rule, the scrolling time bar 300 corresponding to such partition is displayed and then scrolling arrows 300A and 300B (see FIG. 11) are displayed at both ends of the scrolling time bar 300. In such case, when scrolling towards either left or right or towards both sides is impossible, the scrolling arrow is not displayed in the direction towards which scrolling is disabled. Further, a changing mark 101 is displayed on the scroll time bar 300 in order to allow visual recognition of the current playing position (S41). Next, from the event starting position 31 within the event information data 3 of each event included in the displayed partition represented by the scrolling time bar 300, a position on the time bar 300 corresponding to each event scene is calculated and then each icon is displayed on the calculated position (S42).

As shown in FIG. 11, scrolling arrows 300A and 300B are displayed on both ends of the scrolling time bar 300 and a plurality of icons is displayed the scrolling time bar 300. When the cursor 103 is located in a position of an icon at the far left edge among the displayed icons, scrolling of the scrolling time bar 300 is performed when the spectator pushes the left direction button 2A. In other words, when the spectator pushes the left direction button 2A in a situation as shown in FIG. 11, a scrolling time bar corresponding to a partition over the timeline that is adjacent and preceding to the currently displayed partition is displayed, replacing the scrolling time bar 300 currently displayed.

In the event of such display process, the process shown in the flowchart of FIG. 10 is done by performing step S41 in such a way in which, instead showing the scroll time bar 300 corresponding to a partition including the current playing position, a scrolling time bar corresponding to the partition that is adjacent to the partition including the current position is displayed. Likewise, when the cursor 103 is located in a position of an icon at the far right edge among the displayed icons and the spectator pushes the right direction button 2B, a scrolling time bar corresponding to a partition over the timeline that is adjacent and subsequent to the currently displayed partition is displayed, in a way similar to that described above.

When all the event icons cannot be displayed on the time bar, the time bar is set so as to cover one partition within the whole reproduction time of the video contents, so that the spectator scrolls the time bar through the operation of the remote controller 16, thus allowing browsing of icons that cannot be displayed so far.

Figure 12:
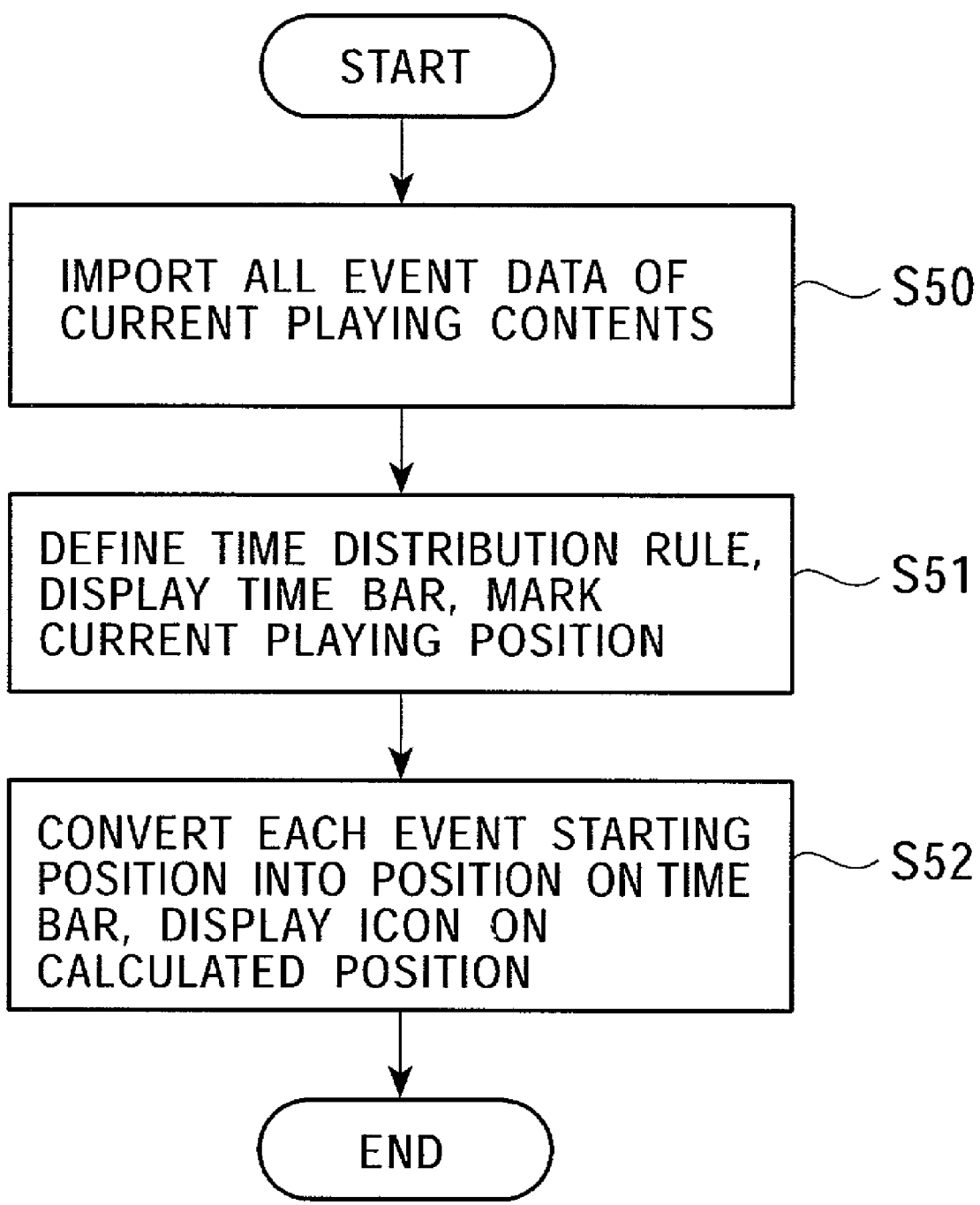
FIG. 12 is a flowchart showing a process of displaying a non linear time bar according to a digital video recording and reproducing apparatus of a third preferred embodiment of the present invention.

A digital video reproducing apparatus according to a third preferred embodiment of the present invention is described below based on FIG. 12 to FIG. 13. Such third preferred embodiment of the present invention differs from the digital video recording and reproducing apparatus of the first embodiment of the invention only in the aspect in which a non linear time bar 400 is displayed, without magnification of a particular partition.

When all icons cannot be displayed on the time bar 100 to an extent that the spectator can recognize each icon because there is a great amount of icons to be displayed on the time bar 100, a non linear time bar 400 (see FIG. 13) is displayed. The process of displaying such non linear time bar 400 starts when the spectator pushes the time bar 2D on the remote controller 2 so as to command displaying of the time bar. As shown in FIG. 12, at first, all event information data corresponding to current playing video contents are imported (S50). Then, a time density distribution on the non linear time bar 400 is determined in accordance with a predetermined rule. Further, a changing mark 101 is displayed on the non linear time bar 400 in order to allow visual recognition of the current playing position (S51). Next, a width of the non linear time bar 400 is changed in order to correspond to the time density distribution, so as to allow the spectator to recognize the time density. In other words, as shown in FIG. 13, the partition of the lowest time density that includes the current playing position is set to have a largest width and, as the time density for each sector becomes higher for points that are farther from the current playing position, the width of each partition is set to become gradually narrow. In addition, partitions having similar time density distributions on the non linear time bar 400 are set to have similar colors or patters, so that the time density is expressed my means of coloring or patterning. Further, the non linear time bar 400 is displayed so that a length of each partition on the timeline axis direction is set to be different for every partition having a different time density distribution (S51). Then, from information and time density distribution of the event starting position 31 for each event information data 3, a position of each event scene on the non linear time bar 400 is calculated, then if there is enough space for displaying an icon in the sector that includes the calculated position, then the icon is displayed, otherwise, if there is not enough space for display, the icon is not displayed (S52).

Figure 13:
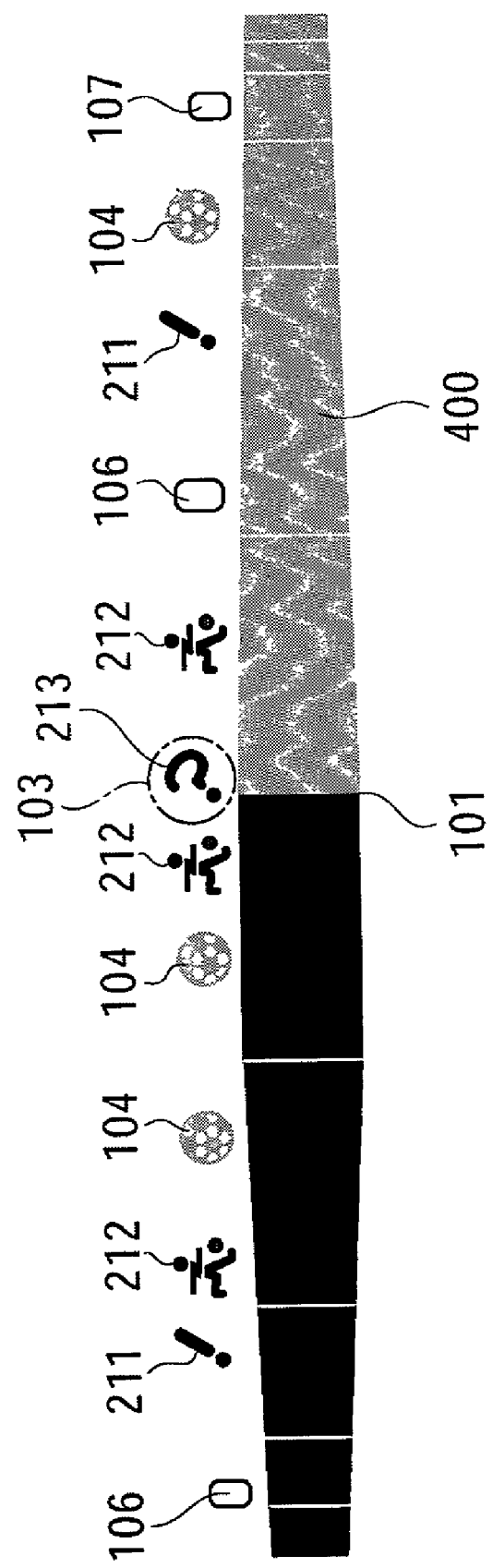
FIG. 13 is a diagram showing the non linear time bar displayed on the screen, according to the digital video recording and reproducing apparatus of the third preferred embodiment of the present invention.

In such non linear time bar 400, as shown in FIG. 13, the width of the time bar is different for different regions thereof depending on the time density. As for a central portion, the time density is small, so that the width of one partition on the non linear time bar 400 is large and, as approaching both ends of the time bar, the time density becomes higher. In a place where the partition is narrow, as a number of icons that can be displayed in is limited, only a few icons are displayed. Furthermore, as length over the timeline and color is different for each sector on the non linear time bar 400, the time density can be easily distinguished by the spectator. A currently selected event 213 is surrounded by the cursor 103 and it is always displayed in a central portion of the non linear time bar 400. By displaying in such way, display is done so that the time density in a vicinity of an event displayed in the center, that is, the time density nearby a currently selected event becomes small and, for a event located away from such selected event, the time density becomes high. In such display process, instead of setting a low time density for a partition in the vicinities of the current playing position as in the step S51 shown in FIG. 12, the flowchart of FIG. 12 can be executed by setting the time density low for a partition in the vicinities of the currently selected event.

When all the event icons cannot be displayed on the time bar, as only predetermined icons are displayed, only icons related to a place in which the spectator is interested in is displayed in detail, so that the spectator can browse information on event scenes throughout the entire video contents more effectively, so that the spectator can jump easily to a scene of his interest.

Finally, the configurations and structures of respective units and portions described specifically with respect to the preferred embodiments of the present invention are only examples of realization of the present invention, so the embodiments thereof should not be construed as to limiting the technical scope of the present invention.

Figure 14:
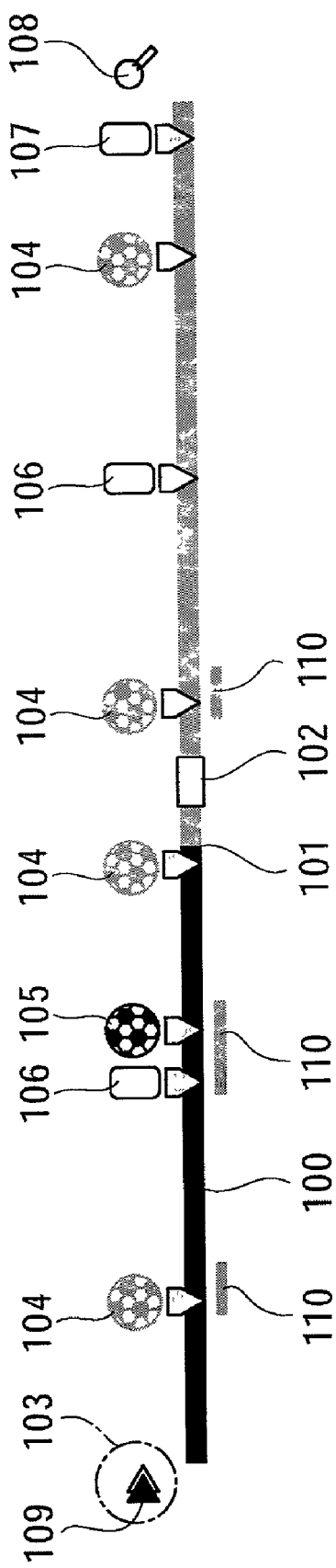
FIG. 14 is a diagram showing a time bar displayed on the screen and lines indicating that it is possible to expand and re-display the time bar, according a the digital video recording and reproducing apparatus of an alternative embodiment of the present invention

A digital video reproducing apparatus of the present invention is not limited to the preferred embodiments described above, but many other variations and improvements are possible within the scope of the invention. For example, according to a variation of a digital video recording and reproducing apparatus of the present invention, as shown in FIG. 14, a line 110 is displayed in the bottom of the time bar 100, indicating a partition that has an icon that is not displayed on the time bar 100. In such case, it is possible to expand and re-display such hidden icons only when the current playing position 101 enters in the line 110. As a result, the spectator can avoid expanding and re-displaying inadvertently. In addition, when searching a certain event, the spectator can intentionally make the cursor 103 jump to the place where the line 110 is displayed and, by expanding and re-displaying it, all event icons can be browsed efficiently.

In addition, although the storage 11 of the digital video recording and reproducing apparatus 1 of the first embodiment of the present invention was comprised of a magnetic hard disc, instead of such magnetic hard disc, another recording medium of public knowledge such as a recordable DVD, a magnetic tape or the like can be used.

Still, although according to the first embodiment of the present invention the external communication line is a telephone line and the digital video recording and reproducing apparatus 1 is connected to the communication line through the modem 26, the external communication line can be of any kind such as a cable or a network cable of cable television line or the like, and a tuner or the like may be established in the digital video recording and reproducing apparatus, replacing modem 26 as a means for connecting the apparatus to the communication line.

In the digital video recording and reproducing apparatus according the present invention, it is possible to provide only an outside video signal input terminal as the video signal source for picture recording, without providing the television tuner 16.

In addition, the digital video recording and reproducing apparatus according to the present invention, both the video contents and the event information data can be downloaded by means of the modem 26, which is a communications means, and then stored in the storage 15, without providing the tuner 16, the MPEG decoder 20 and the multiplex data extracting circuit 19.

The video image may be reproduced under a high-speed communication environment using a video-on-demand (VOD). In such case, by means of first downloading all the event information data using the modem 26 as a communications means, the display of the time bar can be done by using the event information data, so that the spectator can watch the video contents through the digital video reproduction method according to the present invention. By doing that, a construction in which storage is not provided for in the digital video reproducing apparatus can be obtained. In addition, in such case, it is preferable to have a construction in which the event information data and the like are stored in the RAM 13.

The memory ROM 14 can be also used to store the operation system, a portion of the operating system or the application program.

The event starting position 31 can be also used for storing information showing an image frame number.

Although the event icon 34 contains image data prepared beforehand, a picture taken out from a video image based on the video contents may be instead stored as image data.

It is also allowed to provide some event scenes in common and icon data corresponding to such event scenes as fixed images for the digital video recording and reproducing apparatus, regardless of the video contents.

They event information data may also be used as a list for the event information data 3 and in this case, although specific event numbering is assigned to each event information data 3, such event numbering is not numbering corresponding in order of arrangement like in the descriptions of the preferred embodiments of the present invention.

The destination for the video signal synthesized by the video signal process circuit 25, as well as the audio signal synthesized by the audio signal process circuit 24, can be an appliance like a television receiver, replacing the display and the speaker that are not illustrated.

The digital video recording and reproducing apparatus based on the present invention may be comprised of an appliance the speaker and the display, such as a television receiver integrated to the digital video recording and reproducing apparatus of the first preferred embodiment of the present invention, as well as a personal computer having AV functions.

The storage 11 may be a non re-writing medium like a DVD and a video reproduction method according to the present invention can be realized using the video contents and the event information data recorded in such DVD.

Operations like shifting between displaying and non displaying of the time bar, as well as the operation of selection of an icon showing an event scene, can be done by using buttons other than the left direction button 2A, the right direction button 2B, the enter button 2C and the time bar button 2D on the remote controller 2 or still, by a menu displayed on the screen.

The time bar may still be displayed in a longitudinal, a diagonal or any other direction.

Although in the digital video recording and reproducing apparatus according to the first preferred embodiment of the present invention the vicinity of the current playing position is magnified and re-displayed upon the spectator selecting the icon 108, a zoom button may be provided for the remote controller 2 and, by means of pushing the zoom button, the vicinity of the icon corresponding to the event scene selected by the spectator is magnified and re-display. In addition, as the current playing position varies, the magnified and re-displayed area can be moved accordingly.

In the digital video recording and reproducing apparatus according to the second preferred embodiment of the present invention, although when scrolling towards either left or right or towards both sides is impossible, the scrolling arrow is not displayed in the direction towards which scrolling is disabled, it is also possible to make the color of the arrow in the direction towards which scrolling is disabled change to gray. It is also possible to move a portion to be displayed on the scrolling time bar according to a change in the current playing position.

In the present invention, when all the event icons cannot be displayed on the time bar, although according to the first to the third preferred embodiments of the present invention the three different display methods have been explained as been separated, those methods may be used in conjunction or, a single digital video recording and reproducing apparatus may be constituted so as to perform displaying by using two ways or more.

What is claimed is:

1. A digital video reproduction method for reproducing at least one image based on video contents and metadata, wherein
   said video contents include an event scene, wherein said event scene is peculiar to a motion picture;
   said metadata comprises at least event information data having a designation of a starting position and contents of said event scene;
   said digital video reproduction method comprises the steps of using said event information data and reproducing an image from said event scene selected by a spectator,
   wherein when recognition of an icon by a spectator is difficult when all icons corresponding to said event scene included in said video contents are displayed on a time bar,
   wherein said time bar corresponds to an entire reproduction time of said video contents, said digital video reproduction method further comprises the steps of:
      displaying a portion of said time bar as an expanded time bar, wherein said portion of said time bar includes a selected position on said time bar; and
      displaying an icon on said expanded time bar, wherein said icon corresponds to an event scene included in said portion of said time bar.

2. The digital video reproduction method according to claim 1, wherein
   said metadata includes information on reproduction time related to video contents, wherein said digital video reproduction method comprises the steps of:
   displaying a timeline on a display apparatus screen as a time bar during reproduction of said image or upon an operation by a spectator at a time of starting reproduction, wherein said time bar corresponds to a reproduction time of video contents, and said video contents are based on said reproduction time;
   displaying an icon corresponding to said event scene on a starting position of said event scene on said time bar, wherein said displaying is based on said event information data; and
   reproduction of image from a starting position of said event scene corresponding to said icon, wherein said icon is an icon selected by a spectator.

3. A digital video reproduction method for reproducing at least one image based on video contents and metadata, wherein
   said video contents include an event scene, wherein said event scene is peculiar to a motion picture;
   said metadata comprises at least event information data having a designation of a starting position and contents of said event scene;
   said digital video reproduction method comprises the steps of using said event information data and reproducing an image from said event scene selected by a spectator,
   wherein when recognition of and an icon by a spectator is difficult when all icons corresponding to said event scene included in said video contents are displayed on a time bar, wherein said time bar corresponds to an entire reproduction time of said video contents, said digital video reproduction method further comprises the steps of:
      determination of a selected reproduction time partition, wherein said reproduction time partition is selected from a timeline corresponding to an entire reproduction time;

displaying a scrolling time bar, wherein said scrolling time bar corresponds to said selected reproduction time partition;

displaying said icon on said scrolling time bar, wherein said icon corresponds to an event scene included in said selected reproduction time partition;

scrolling said selected reproduction time partition, wherein a direction of said scrolling is designated by a spectator;

displaying said scrolling time bar corresponding to a reproduction time partition after said scrolling; and displaying an icon corresponding to an event scene included in said reproduction time partition after scrolling.

4. A digital video reproduction method for reproducing at least one image based on video contents and metadata, wherein said video contents including an event scene, wherein said event scene is peculiar to a motion picture:

said metadata comprises at least event information data having a designation of a starting position and contents of said event scene;

said digital video reproduction method comprises the steps of using said event information data and reproducing an image from said event scene selected by a spectator, wherein when recognition of an icon by a spectator is difficult when all icons corresponding to said event scene included in said video contents are displayed on a time bar, wherein said time bar corresponds to an entire reproduction time of said video contents, said digital video reproduction method further comprises the steps of:

splitting and displaying said time bar in a plurality of non linear partitions, wherein a time density of said displaying is set minimum for a partition selected by a spectator and maximum for a partition located far from said selected partition; and displaying an icon corresponding to an event scene included in each of said partitions, wherein said icon is displayed only when said icon does not overlap with another icon when displayed.

5. A digital video reproducing apparatus, comprising:

a storage means for storing video contents and metadata, wherein said video contents include an event scene, wherein said event scene is peculiar to a motion picture; and said metadata comprises at least event information data having a designation of a starting position and contents of said event scene;

a means for controlling image reproduction based on said video contents and said metadata, wherein said means for controlling image at least reproduces image; wherein said digital video reproducing apparatus connected to a display apparatus includes said means for controlling image reproduction using said event information data and reproducing image from an event scene selected by a spectator; and said metadata includes reproduction time information related to video contents;

said digital video reproducing apparatus comprises a means for displaying a secondary image, wherein during reproduction of said image or upon operation by a spectator, said means for displaying the secondary image displays:

a timeline on a display apparatus screen as a time bar based on said reproduction time information, wherein said timeline corresponds to a reproduction time of video contents; and an icon on a starting position of said event scene on the time bar based on said event information data, wherein said icon corresponds to said event scene; and said means for controlling image reproduction reproduces image from a starting position of said event scene, said event scene corresponding to said icon selected by a spectator, wherein when recognition of said icon by a spectator is difficult when all icons corresponding to said event scene included in said video contents are displayed on said time bar, wherein said time bar corresponds to an entire reproduction time of said video contents, said means for displaying the secondary image displays:

a portion of said time bar as an expanded time bar, wherein said portion of said time bar includes a selected position on said time bar; and an icon on said expanded time bar, wherein said icon corresponds to an event scene included in said portion of said time bar.

6. The digital video reproducing apparatus according to claim 5, wherein each of said event information data includes an attribute related to said event scene;

said digital video reproducing apparatus has a search means for searching an event information data having said attribute, wherein said attribute is selected from all event information data stored in said storage; and said means for controlling image reproduction reproduces image from an event scene corresponding to an event information data, wherein said event information data is selected by a spectator from said event information data searched by said search means.

7. The digital video reproducing apparatus according to claim 5, wherein each of said event information data includes an attribute related to said event scene;

said digital video reproducing apparatus has a search means for searching an event information data having said attribute, wherein said attribute is selected from all event information data stored in said storage; and said means for controlling image reproduction reproduces image from an event scene corresponding to an event information data, wherein said event information data is selected by a spectator from said event information data searched by said search means.

8. The digital video reproducing apparatus according to claim 5, wherein each of said event information data includes an attribute related to said event scene;

said digital video reproducing apparatus has a search means for searching an event information data having said attribute, wherein said attribute is selected from all event information data stored in said storage; and said means for controlling image reproduction reproduces image from an event scene corresponding to an event information data, wherein said event information data is selected by a spectator from said event information data searched by said search means.

9. A digital video reproducing apparatus, comprising:
a storage means for storing video contents and metadata, wherein
said video contents include an event scene, wherein said event scene is peculiar to a motion picture; and
said metadata comprises at least event information data having a designation of a starting position and contents of said event scene;
a means for controlling image reproduction based on said video contents and said metadata, wherein said means for controlling image at least reproduces image; wherein
said digital video reproducing apparatus connected to a display apparatus includes said means for controlling image reproduction using said event information data and reproducing image from an event scene selected by a spectator; and
said metadata tides reproduction time information related to video contents;
said digital video reproducing apparatus comprises a means for displaying a secondary image, wherein during reproduction of said image or upon operation by a spectator, said means for displaying the secondary image displays;
a timeline on a display apparatus screen as a time bar based on said reproduction time information, wherein said timeline corresponds to a reproduction time of video contents; and
an icon on a starting position of said event scene on the time bar based on said event information data, wherein said icon corresponds to said event scene; and
said means for controlling image reproduction reproduces image from a stailing position of said event scene, said event scene corresponding to said icon selected by a spectator,
wherein when recognition of said icon by a spectator is difficult when all icons corresponding to said event scene included in said video contents are displayed on said time bar, wherein said time bar corresponds to an entire reproduction time of said video contents, said means for displaying the secondary image:
determines a selected reproduction time partition, wherein said reproduction time partition is selected from a timeline corresponding to an entire reproduction time;
displays a scrolling time bar, wherein said scrolling time bar corresponds to said selected reproduction time partition;
displays said icon on said scrolling time bar, wherein said icon corresponds to an event scene included in said selected reproduction time partition;
scrolls said selected reproduction time partition, wherein a direction of scrolling is designated by a spectator;
displays said time bar, wherein said time bar corresponds to a reproduction time partition after said scrolling; and
displays an icon, wherein said icon corresponds to an event scene included in said reproduction time partition after scrolling.

10. The digital video reproducing apparatus according to claim 9, wherein
each of said event information data includes an attribute related to said event scene;
said digital video reproducing apparatus has a search means for searching an event information data having said attribute, wherein said attribute is selected from all event information data stored in said storage; and
said means for controlling image reproduction reproduces image from an event scene corresponding to an event information data, wherein said event information data is selected by a spectator from said event information data searched by said search means.

11. A digital video reproducing apparatus, comprising:
a storage means for storing video contents and metadata, wherein
said video contents include an event scene, wherein said event scene is peculiar to a motion picture; and
said metadata composes at least event information data having a designation of a starting position and contents of said event scene;
a means for controlling image reproduction based on said video contents and said metadata, wherein said means for controlling image at least reproduces image; wherein
said digital video reproducing apparatus connected to a display apparatus includes said means for controlling image reproduction using said event information data and reproducing image from an event scene selected by a spectator; and
said metadata includes reproduction time information related to video contents;
said digital video reproducing apparatus comprises a means for displaying a secondary image, wherein during reproduction of said image or upon operation by a spectator, said means for displaying the secondary image displays:
a timeline on a display apparatus screen as a time bar based on said reproduction time information, wherein said timeline corresponds to a reproduction time of video contents; and
an icon on a starting position of said event scene on the time bar based on said event information data, wherein said icon corresponds to said event scene; and
said means for controlling image reproduction reproduces image from a starting position of said event scene, said event scene corresponding to said icon selected by a spectator,
wherein when recognition of said icon by a spectator is difficult when all icons corresponding to said event scene included in said video contents are displayed on said time bar, wherein said time bar corresponds to an entire reproduction time of said video contents, said means for displaying the secondary image:
splits and displays said timebar in a plurality of non linear partitions, wherein a time density is set minimum for a partition selected by a spectator and maximum for a partition located far from said selected partition; and
displays an icon corresponding to an event scene included in each of said partitions, wherein said icon is displayed only when said icon does not overlap with another icon when displayed.

12. The digital video reproducing apparatus according to claim 11, wherein
each of said event information data includes an attribute related to said event scene;
said digital video reproducing apparatus has a search means for searching an event information data having said attribute, wherein said attribute is selected from all event information data stored in said storage; and said means for controlling image reproduction reproduces image from an event scene corresponding to an event information data, wherein said event information data is selected by a spectator from said event information data searched by said search means.

13. A digital video reproducing apparatus, comprising:
a communication means for receiving video contents and metadata, wherein
said video contents include an event scene, wherein said event scene is peculiar to a motion picture; and
said metadata comprises at least event information data having a designation of a starting position and contents of said event scene; and
means for controlling image reproduction for at least reproducing image based on said video contents and said metadata; wherein
said video reproducing apparatus connected to a display apparatus includes said means for controlling image reproduction using said event information data and reproducing image from an event scene selected by a spectator;
said metadata includes reproduction time information related to video contents;
said digital video reproducing apparatus comprises a means for displaying a secondary image, wherein during reproduction of said image or upon operation by a spectator, said means for displaying the secondary image displays:
a timeline on a display apparatus screen as a time bar based on said reproduction time information, wherein said timeline corresponds to a reproduction time of video contents; and
an icon on a starting position of said event scene on the time bar based on said event information data, wherein said icon corresponds to said event scene; and
said means for controlling image reproduction reproduces image from a starting position of said event scene, said event scene corresponding to said icon selected by a spectator,
wherein when recognition of said icon by a spectator is difficult when all icons corresponding to said event scene included in said video contents are displayed on said time bar,
wherein said time bar corresponds to an entire reproduction time of said video contents, said means for displaying the secondary image displays;
a portion of said time bar as an expanded time bar, wherein said portion of said time bar includes a selected position on said time bar; and
an icon on said expanded time bar, wherein said icon corresponds to an event scene included in said portion of said time bar.

14. A digital video reproducing apparatus, comprising:
a communication means for receiving video contents and metadata, wherein
said video contents include an event scene, wherein said event scene is peculiar to a motion picture; and
said metadata comprises at least event information data having a designation of a starting position and contents of said event scene; and
means for controlling image reproduction for at least reproducing image based on said video contents and said metadata; wherein
said digital video reproducing apparatus connected to a display apparatus includes said means for controlling image reproduction using said event information data and reproducing image from an event scene selected by a spectator;
said metadata includes reproduction time information related to video contents;
said digital video reproducing apparatus comprises a means for displaying a secondary image, wherein during reproduction of said image or upon operation by a spectator, said means for displaying the secondary image displays;
a timeline on a display apparatus screen as a time bar based on said reproduction time information, wherein said timeline corresponds to a reproduction time of video contents; and
an icon on a starting position of said event scene on the time bar based on said event information data, wherein said icon corresponds to said event scene; and
said means for control ling image reproduction reproduces image from a starting position of said event scene, said event scene corresponding to said icon selected by a spectator,
wherein when recognition of said icon by a spectator is difficult when all icons corresponding to said event scene included in said video contents are displayed on said time bar, wherein said time bar corresponds to an entire reproduction time of said video contents, said means for displaying the secondary image:
determines a selected reproduction time partition, wherein said reproduction time partition is selected from a timeline corresponding to an entire reproduction time;
displays a scrolling time bar, wherein said scrolling time bar corresponds to said selected reproduction time partition;
displays said icon on said scrolling time bar, wherein said icon corresponds to an event scene included in said selected reproduction time partition;
scrolls said selected reproduction time partition, wherein a direction of scrolling is designated by a spectator;
displays said time bar, wherein said time bar corresponds to a reproduction time partition after said scrolling; and
displays an icon, wherein said icon corresponds to an event scene included in said reproduction time partition after scrolling.

15. A digital video reproducing apparatus, comprising:
a communication means for receiving video contents and metadata, wherein
said video contents include an event scene, wherein said event scene is peculiar to a motion picture; and
said metadata comprises at least event information data having a designation of a starting position and contents of said event scene; and
means for controlling image reproduction for at least reproducing image based on said video contents and said metadata; wherein
said digital video reproducing apparatus connected to a display apparatus includes said means for controlling image reproduction using said event information data and reproducing image from an event scene selected by a spectator;
said metadata includes reproduction time information related to video contents;
said digital video reproducing apparatus comprises a means for displaying a secondary image, wherein during reproduction of said image or upon operation by a spectator, said means for displaying the secondary image displays:

a timeline on a display apparatus screen as a time bar based on said reproduction time information, wherein said timeline corresponds to a reproduction time of video contents; and an icon on a stalling position of said event scene on the time bar based on said event information data, wherein said icon corresponds to said event scene; and said means for controlling image reproduction reproduces image from a starting position of said event scene, said event scene corresponding to said icon selected by a spectator, wherein when recognition of said icon by a spectator is difficult when all icons corresponding to said event scene included in said video contents are displayed on said time bar, wherein said time bar corresponds to an entire reproduction time of said video contents, said means for displaying the secondary image:

splits and displays said time bar in a plurality of non linear partitions, wherein a time density is set minimum for a partition selected by a spectator and maximum for a partition located far from said selected partition; and displays an icon corresponding to an event scene included in each of said partitions, wherein said icon is displayed only when said icon does not overlap with another icon when displayed.

16. A digital video recording and reproducing apparatus, comprising:

means for controlling image reproduction for at least reproducing image based on video contents and metadata, wherein said video contents including an event scene, wherein said event scene is peculiar to a motion picture; and said metadata comprising at least event information data, wherein said event information data have a designation of a starting position and contents of said event scene; and said digital video recording and reproducing apparatus connected to a display apparatus, comprises:

contents input means for inputting said video contents;

event information data input means for inputting said event information data; and storage means for storing said video contents and said event information data; wherein said event information data is inputted as added to said video contents or separated from said video contents; and said means for controlling image reproduction uses said event information data and reproduces image from said event scene selected by a spectator:

said metadata includes reproduction time information related to video contents;

said digital video reproducing apparatus comprises means for displaying a secondary image, wherein during reproduction of said image or upon operation by a spectator, said means for displaying the secondary image displays:

a timeline on a display apparatus screen as a time bar based on said reproduction time information, wherein said timeline corresponds to a reproduction time of video contents; and an icon on a starting position of said event scene on said time bar based on said event information data, wherein said icon corresponds to said event scene; and said means for controlling image reproduction reproduces image from a starting position of said event scene, said event scene corresponding to said icon selected by a spectator, wherein when recognition of said icon by a spectator is difficult when all icons corresponding to said event scene included in said video contents are displayed on said time bar, wherein said time bar corresponds to an entire reproduction time of said video contents, said means for displaying the secondary image displays:

a portion of said time bar as an expanded time bar, wherein said portion of said time bar includes a selected position on said time bar; and an icon on said expanded time bar, wherein said icon corresponds to an event scene included in said portion of said time bar.

17. A digital video recording and reproducing apparatus, comprising:

means for controlling image reproduction for at least reproducing image based on video contents and metadata, wherein said video contents including an event scene, wherein said event scene is peculiar to a motion picture; and said metadata comprising at least event information data, wherein said event information data have a designation of a starting position and contents of said event scene; and said digital video recording and reproducing apparatus connected to a display apparatus, comprises:

contents input means for inputting said video contents;

event information data input means for inputting said event information data; and storage means for storing said video contents and said event information data; wherein said event information data is inputted as added to said video contents or separated from said video contents; and said means for controlling image reproduction uses said event information data and reproduces image from said event scene selected by a spectator;

said metadata includes reproduction time information related to video contents;

said digital video reproducing apparatus comprises means for displaying a secondary image, wherein during reproduction of said image or upon operation by a spectator, said means for displaying the secondary image displays:

a timeline on a display apparatus screen as a time bar based on said reproduction time information, wherein said timeline corresponds to a reproduction time of video contents; and an icon on a starting position of said event scene on said time bar based on said event information data, wherein said icon corresponds to said event scene; and said means for controlling image reproduction reproduces image from a starting position of said event scene, said event scene corresponding to said icon selected by a spectator, wherein when recognition of said icon by a spectator is difficult when all icons corresponding to said event scene included in said video contents are displayed on said time bar, wherein said time bar corresponds to an entire reproduction time of said video contents, said means for displaying the secondary image:
  determines a selected reproduction time partition, wherein said reproduction time partition is selected from a timeline corresponding to an entire reproduction time;
  displays a scrolling time bar, wherein said scrolling time bar corresponds to said selected reproduction time partition;
  displays said icon on said scrolling time bar, wherein said icon corresponds to an event scene included in said selected reproduction time partition;
  scrolls said selected reproduction time partition, wherein a direction of scrolling is designated by a spectator;
  displays said time bar, wherein said time bar corresponds to a reproduction time partition after said scrolling; and
  displays an icon, wherein said icon corresponds to an event scene included in said reproduction time partition after scrolling.

18. A digital video recording and reproducing apparatus, comprising:
  means for controlling image reproduction for at least reproducing image based on video contents and metadata, wherein
    said video contents including an event scene, wherein said event scene is peculiar to a motion picture; and
    said metadata comprising at least event information data, wherein said event information data have a designation of a starting position and contents of said event scene; and
  said digital video recording and reproducing apparatus connected to a display apparatus, comprises:
    contents input means for inputting said video contents;
    event information data input means for inputting said event information data; and
    storage means for storing said video contents and said event information data; wherein
  said event information data is inputted as added to said video contents or separated from said video contents; and
  said means for controlling image reproduction uses said event information data and reproduces image from said event scene selected by a spectator;
  said metadata includes reproduction time information related to video contents;
  said digital video reproducing apparatus comprises means for displaying a secondary image, wherein during reproduction of said image or upon operation by a spectator, said means for displaying the secondary image displays:
    a timeline on a display apparatus screen as a time bar based on said reproduction time information, wherein said timeline corresponds to a reproduction time of video contents; and
    an icon on a starting position of said event scene on said time bar based on said event information data, wherein said icon corresponds to said event scene; and
  said means for controlling image reproduction reproduces image from a starting position of said event scene, said event scene corresponding to said icon selected by a spectator,
  wherein when recognition of said icon by a spectator is difficult when all icons corresponding to said event scene included in said video contents are displayed on said time bar, wherein said time bar corresponds to an entire reproduction time of said video contents, said means for displaying the secondary image:
    splits and displays said time bar in a plurality of non linear partitions, wherein a time density is set minimum for a partition selected by a spectator and maximum for a partition located far from said selected partition; and
    displays an icon corresponding to an event scene included in each of said partitions, wherein said icon is displayed only when said icon does not overlap with another icon when displayed.

* * * * *